US010642229B2

(12) United States Patent
Dickey

(10) Patent No.: US 10,642,229 B2
(45) Date of Patent: May 5, 2020

(54) COORDINATION OF VARIABLE GROUPINGS OF CONTROL CHANNELS

(71) Applicant: Hamilton Sundstrand Corporation, Charlotte, NC (US)

(72) Inventor: John A. Dickey, Caledonia, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1592 days.

(21) Appl. No.: 14/338,185

(22) Filed: Jul. 22, 2014

(65) Prior Publication Data

US 2016/0026160 A1 Jan. 28, 2016

(51) Int. Cl.
*H02H 3/00* (2006.01)
*G05B 11/01* (2006.01)
*H02H 9/02* (2006.01)
*H02H 7/26* (2006.01)
*H02H 7/28* (2006.01)

(52) U.S. Cl.
CPC ............. *G05B 11/01* (2013.01); *H02H 7/261* (2013.01); *H02H 7/28* (2013.01); *H02H 9/02* (2013.01)

(58) Field of Classification Search
CPC .................................. G05B 11/01; H02H 9/02
USPC ............................................. 327/203; 361/63
See application file for complete search history.

(56) References Cited

U.S. PATENT DOCUMENTS

| 5,175,413 A * | 12/1992 | Holling | G05B 9/03 |
| | | | 219/483 |
| 2013/0207705 A1* | 8/2013 | Prabhuk | H02J 1/08 |
| | | | 327/203 |
| 2014/0265550 A1* | 9/2014 | Milligan | H04L 12/10 |
| | | | 307/1 |

FOREIGN PATENT DOCUMENTS

| EP | 2658065 A1 | 10/2013 |
| WO | WO-2007/000498 A1 | 1/2007 |
| WO | WO-2013/182244 A1 | 12/2013 |

OTHER PUBLICATIONS

Extended European Search Report dated Nov. 30, 2015, issued during the prosecution of corresponding European Patent Application No. EP 15173162.7.

(Continued)

*Primary Examiner* — Thienvu V Tran
*Assistant Examiner* — Lucy M Thomas
(74) *Attorney, Agent, or Firm* — Locke Lord LLP; Daniel J. Fiorello; Scott D. Wofsy

(57) ABSTRACT

A system for dynamically controlling the functionality of control channels in an electrical system includes a plurality of control channels, each operatively connected to at least one state change device connected to an electrical component. Each control channel is operatively connected to at least one adjacent control channel by a control channel communication line. Each control channel is configured to store grouping information of the state change device. A controller is operatively connected to each control channel such that each control channel can receive the grouping information from the controller. The controller is configured to selectively send grouping information to allow each control channel to directly communicate with adjacent control channels within their respective grouping such that each control channel in a grouping functions together in unison when the at least one state change device in a grouping changes state.

8 Claims, 3 Drawing Sheets

(56) References Cited

OTHER PUBLICATIONS

Communication Pursuant to Article 94(3) EPC, dated Jun. 20, 2018, issued in corresponding European Patent Application No. 15173162.7.

* cited by examiner

COORDINATION OF VARIABLE GROUPINGS OF CONTROL CHANNELS

BACKGROUND

1. Field

The present disclosure relates to electrical systems, in particular to electrical systems including state change devices and control channels associated therewith.

2. Description of Related Art

Solid state power controllers (SSPC's) can be grouped into configurations to form fewer, larger control channels for control of loads that are too heavy for a single control channel to operate or simply to use common size smaller channels to make larger ones instead of programming larger ones down to smaller load size values and wasting hardware. This configurability allows a wide range of flexibility in utilization of the available hardware resources. There are a variety of ways to control these groups including, e.g., using dedicated commands (logical or physical) sent to all control channels in a group, assigning one of the control channels as master and the others as slaves and providing linkage between them for the master to selectively control the slaves only in a local configured group of control channels, or to make them all interdependent through a coordination linkage system.

In traditional systems, when a particular control channel (or other device associated therewith) in a group determines there is a problem, such as an overcurrent condition, and needs the rest of the control channels in the group to work in unison with the control channel detecting the problem, there is a considerable delay in responding.

Such conventional methods and systems have generally been considered satisfactory for their intended purpose. However, there is still a need in the art for improved control channel systems and methods. The present disclosure provides a solution for this need.

SUMMARY

In at least one aspect of this disclosure, a system for dynamically controlling the functionality of control channels in an electrical system includes a plurality of control channels, each operatively connected to at least one state change device connected to an electrical component. Each control channel is operatively connected to at least one adjacent control channel by a control channel communication line. Each control channel is configured to store grouping information of the state change device. At least one resistor is disposed in electrical communication with the control channel communication line, the resistor being configured to connect to a check voltage such that control channels are exposed to the check voltage through the resistors.

A controller is operatively connected to each control channel such that each control channel can receive the grouping information from the controller, wherein the controller is configured to selectively send grouping information to each control channel such that each state change device and respective control channel is assigned to one or more groupings to allow each control channel to directly communicate with adjacent control channels within their respective grouping such that each control channel in a grouping functions together in unison when the at least one state change device in a grouping changes state.

The grouping information can include group position information such that each control channel is assigned a position in a group relative to other control channels. The group position information can include an indication for each control channel whether the control channel is a first control channel, a middle control channel, or an end control channel.

The control channels can include solid state power controllers or any other suitable controller. In some embodiments, a first state of the at least one state change device is a normal operating state, and a second state of the at least one state change device is an overcurrent state, wherein the control channels of the respective state change device signal adjacent control channels within the same grouping when the state change device changes to the second state.

The first control channel can be configured to directly communicate with only the adjacent control channel within the same grouping and not to communicate with control channels outside the grouping that are connected thereto. The middle control channel can be configured to directly communicate with all adjacent control channels within the same grouping. The last control channel can be configured to directly communicate with only the adjacent control channel within the same grouping and not to communicate with control channels outside the grouping that are connected thereto.

The at least one state change device can be connected to a fuse of an electrical system. In some embodiments, each state change device and/or control channel grouping can be configured to handle a predetermined amperage.

A method for causing rapid control channel response in an electrical system includes determining if a predetermined condition exists for at least one state change device operatively connected to a respective control channel, wherein the state change device and/or the control channel are part of a predetermined grouping, and using the control channel to signal an adjacent control channel to change state of a respective adjacent state change device if the adjacent control channel is within the predetermined group.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
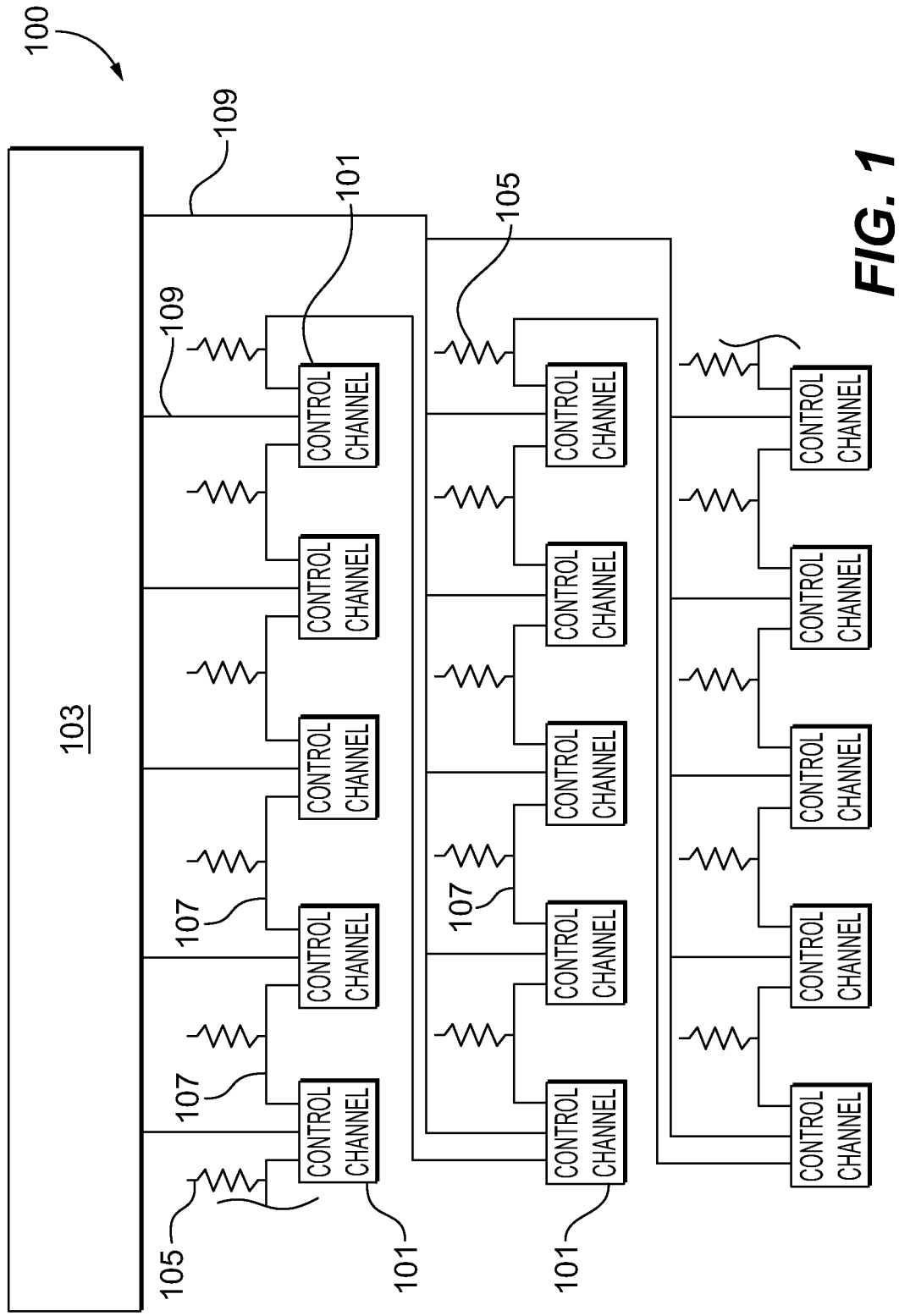
FIG. 1 is a schematic view of a portion of a system in accordance with this disclosure, showing a plurality of control channels interconnected and in communication with a system controller.
Figure 2:
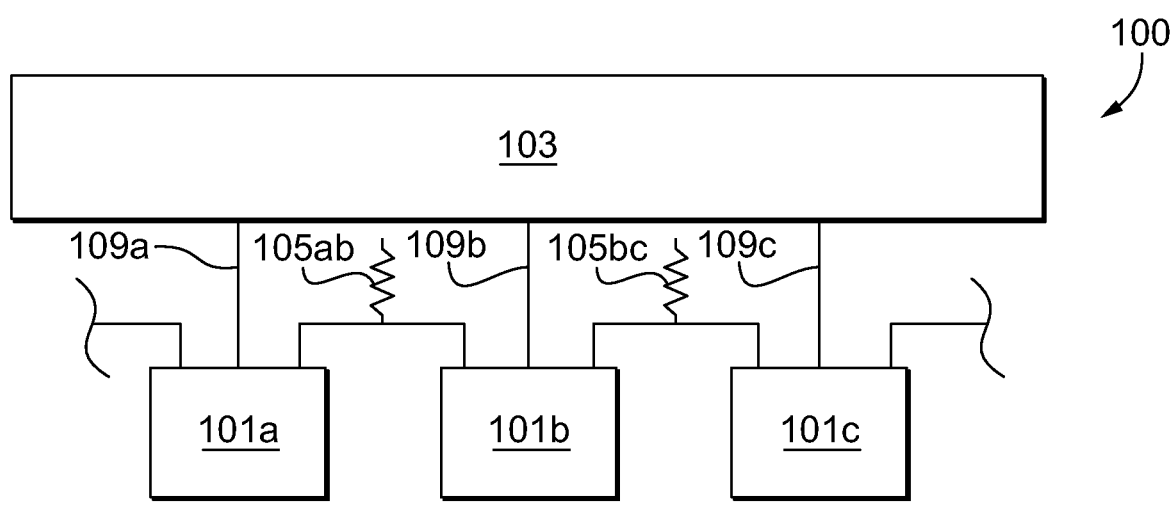
FIG. 2 is a schematic view of a portion of the system of FIG. 1, showing three control channels interconnected and in communication with a system controller.
Figure 3:
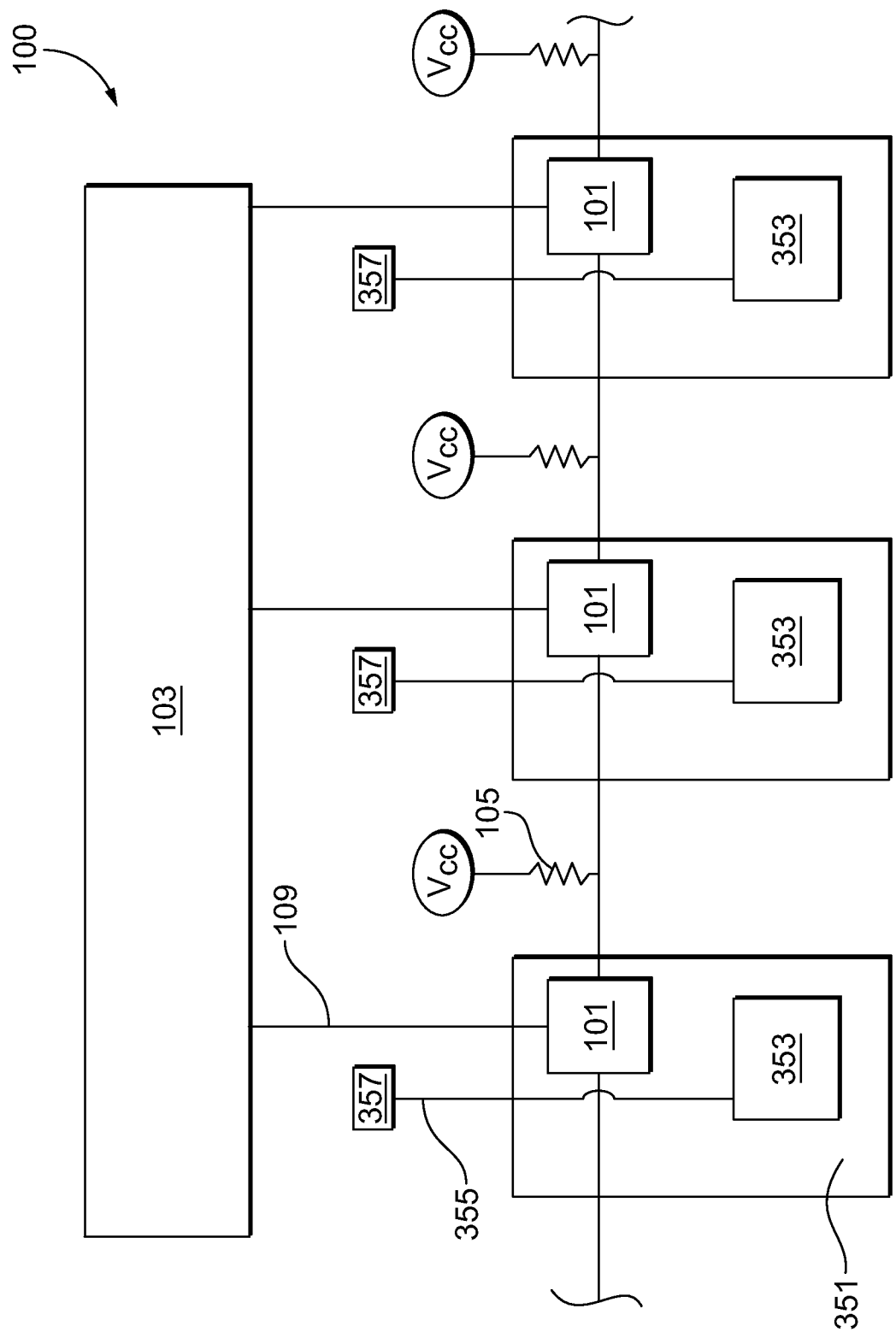
FIG. 3 is a schematic view of a portion of the system of FIG. 1, showing the control channels disposed within state controllers.

Reference will now be made to the drawings wherein like reference numerals identify similar structural features or aspects of the subject disclosure. For purposes of explanation and illustration, and not limitation, an illustrative view of an embodiment of a system in accordance with the disclosure, or aspects thereof, is shown in FIG. 1 and is designated generally by reference character 100. Other portions of the system, or aspects thereof, are shown in FIGS. 2 and 3. The systems and methods described herein can be used to rapidly coordinate control function of a plurality of connected control channels.

Referring to FIGS. 1-3, in at least one aspect of this disclosure, a system 100 for dynamically controlling the functionality of control channels in an electrical system includes a plurality of control channels 101 operatively connected to at least one state change device 351 connected to an electrical component (e.g., a fuse, avionics, or any other suitable device and/or electrical load). Each control channel 101 is operatively connected to at least one adjacent control channel 101 by a control channel communication line 107. Each control channel 101 is configured to store grouping information for the control channel 101 of the change device 351. Control channels 101 can include solid state power controllers or any other suitable type of controller.

At least one resistor 105 is disposed in electrical communication with each control channel communication line 107, the resistor 105 being configured to connect to a check voltage $V_{cc}$ such that control channels 101 are exposed to the check voltage $V_{cc}$ through the resistors 105. In this respect, the resistors 105 are configured as pull-up resistors, but any other suitable configuration (e.g., pull-down resisters) are also contemplated within the scope of this disclosure. While resistor 105 is shown as a separate component, resistor 105 can also be an internal pull-up or pull-down component within the control channel 101 itself so that a separate part on the board is not needed.

A controller 103 is operatively connected to each control channel 101 by a controller line 109 such that each control channel 101 can receive the grouping information from the controller 103. The controller 103 can be any suitable type of controller or computer associated with the electrical system (e.g., a flight computer of an aircraft, a suitable microcontroller such as a field programmable gate array). The controller 103 is configured to selectively send grouping information to each control channel 101 such that each state change 351 device and respective control channels 101 are assigned to one or more groupings to allow each control channel 101 to directly communicate with adjacent control channels 101 within their respective grouping. In this respect, each control channel 101 in a grouping can function together in unison when the state change device 351 in a grouping changes state (e.g., when an overcurrent situation is encountered or in any other suitable tripped and/or triggered scenario).

The grouping information from the controller 103 can include group position information such the each control channel 101 is assigned a position in a group relative to other control channels 101. The group position information can include an indication for each control channel 101 where each are one of a first control channel, a middle control channel, or an end control channel.

Referring to FIG. 2, an embodiment of a portion of the system 100 is shown showing three distinct control channels 101. The controller 103 connects to a first control channel 101a, a middle control channel 101b, and an end control channel 101c via controller lines 109a, 109b, and 109c, respectively. The controller 103 sends information to control channel 101a that it is a beginning control channel in the group. The controller 103 sends information to middle control channel 101b that it is a somewhere between a first control channel 101a and a last control channel 101b in the group, i.e., that it is a middle channel between two adjacent channels 101 (e.g, a start channel and an end channel or between and/or adjacent to other middle channels). The controller 103 sends information to last control channel 101c that it is a final control channel in the group. Based on this logic, the control channels 101a, 101b, 101c, know when to pull resistors 105a and 105b low such that the other control channels 101a, 101b, 101c in the group know to change state, and the control channels know not to pull other resistors 105 low for control channels 101 outside this group.

For example, if the last control channel 101c receives an indication of state change based on monitoring logic 353 from an associated state change device 351 then the last control channel 101c knows to pull-low (e.g., ground) the check voltage $V_{cc}$ associated with resistor 105bc such that control channel 101b no longer experiences the check voltage $V_{cc}$. The last control channel 101c knows not to pull-low any resistor to the right (not shown) since the control channel to the right (not shown) is not part of its group. Also, the last control channel 101c knows not to accept a signal from the right as oriented in FIG. 2 since it is not within that other group. This prevents a short in the system and prevents unrelated devices and control channels from reacting/affecting other groups in the case of a single point failure in one of the channels.

In response to seeing the check voltage $V_{cc}$ disappear, the middle control channel 101b logic knows to pull-low the resistor 105ab to signal the other adjacent control channel 101a. If the middle control channel 101b changes state first, it will pull-low all resistors for all adjacent control channels 101a, 101c. While the system 100 is shown as having two adjacent control channels per middle control channel 101b, it is contemplated that any suitable number of control channels can be disposed adjacent each other.

Referring to FIG. 3, a first state of the at least one state change device 351 is a normal operating state, and a second state of the at least one state change device 351 is an overcurrent state. In this respect, the control channels 101 of the respective state change device 351 signal adjacent control channels 101 within the same grouping when the state change device 351 changes to the second state (e.g., to prevent continued overcurrent and to handle larger loads). The state change device 351 can include a monitoring logic 353 connected to a monitoring device 357 or other suitable portion of circuitry via a monitoring line 355 to determine when a predetermined condition exists to change state.

The at least one state change device 351 can be connected to a load of an electrical system (e.g., for an aircraft or other suitable vehicle). In some embodiments, each state change device 351 and/or control channel grouping can be configured to handle a predetermined amperage (e.g., 2.5 amps per control channel). The control channels 101 and/or state change devices 351 can be grouped together to aggregate to a particular amperage for a specific system associated with an electrical system.

In at least one aspect of this disclosure, a method for causing rapid control channel 101 response in an electrical system includes determining if a predetermined condition exists for at least one state change device 351 operatively connected to a respective control channel 101, wherein the state change device 351 and/or the control channel 101 are part of a predetermined grouping, and using the control channel 101 to signal an adjacent control channel 101 to change state of a respective adjacent state change device 351 if the adjacent control channel 101 is within the predetermined group.

The embodiments herein allow for a simple fixed permanent wired interface between control channels to be utilized in a configurable way that matches the particular control channel group assignments in force at any point in time. The fixed wired system never needs to be modified to reconfigure the groups should the application change.

Normally, for control channels such as solid state power controllers, the groupings disclosed herein would be fixed for a particular application but it is contemplated that some other control applications could be dynamically configured "on the fly" and the coordination methods and systems disclosed herein would still be valid in real time. Also, the disclosed systems and methods can prevent a single point failure of a single control channel 101 and/or group thereof from causing the failure of other channels 101 not in that group.

The methods and systems of the present disclosure, as described above and shown in the drawings, provide rapidly coordinated control functioning of a plurality of connected control channels. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system for dynamically controlling the functionality of control channels in an electrical system, comprising:
    a plurality of control channels operatively connected to at least one state change device connected to an electrical component, each control channel operatively connected to at least one adjacent control channel by a control channel communication line, wherein each control channel stores grouping information of the state change device;
    at least one resistor disposed in electrical communication with the control channel communication line, wherein the resistor is configured to connect to a check voltage such that control channels are exposed to the check voltage through the resistors; and
    a controller operatively connected to each control channel such that each control channel can receive the grouping information from the controller, wherein the controller selectively sends grouping information to each control channel such that each state change device and respective control channel is assigned to one or more groupings to allow each control channel to directly communicate with adjacent control channels within their respective grouping such that each control channel in a grouping functions together in unison when the at least one state change device in a grouping changes state, wherein the grouping information includes group position information such the each control channel is assigned a position in a group relative to other control channels, wherein the group position information includes an indication for each control channel whether the control channel is a first control channel, a middle control channel, or an end control channel, and wherein the last control channel is configured to directly communicate with only the adjacent control channel within the same grouping and not to communicate with control channels outside the grouping that are connected thereto.

2. The system of claim 1, wherein the control channels include solid state power controllers.

3. The system of claim 1, wherein a first state of the at least one state change device is a normal operating state, and a second state of the at least one state change device is an overcurrent state, wherein the control channels of the respective state change device signal adjacent control channels within the same grouping when the state change device changes to the second state.

4. The system of claim 1, wherein the first control channel is configured to directly communicate with only the adjacent control channel within the same grouping and not to communicate with control channels outside the grouping that are connected thereto.

5. The system of claim 1, wherein the middle control channel is configured to directly communicate with all adjacent control channels within the same grouping.

6. The system of claim 1, wherein the at least one state change device is connected to a load of an electrical system.

7. The system of claim 1, wherein each state change device and/or control channel grouping is configured to handle a predetermined amperage.

8. A method for causing rapid control channel response in an electrical system, comprising:
    determining if a predetermined condition exists for at least one state change device operatively connected to a respective control channel, wherein the state change device and/or the control channel are part of a predetermined grouping; and
    using the control channel to signal an adjacent control channel to change state of a respective adjacent state change device if the adjacent control channel is within the predetermined group wherein the control channel includes grouping information includes group position information such the each control channel is assigned a position in a group relative to other control channels, wherein the group position information includes an indication for each control channel whether the control channel is a first control channel, a middle control channel, or an end control channel, and wherein the last control channel is configured to directly communicate with only the adjacent control channel within the same grouping and not to communicate with control channels outside the grouping that are connected thereto.

* * * * *